Dec. 23, 1952    J. B. PARSONS    2,622,529
MOTOR AND PUMP ASSEMBLY
Filed July 13, 1950    3 Sheets-Sheet 1
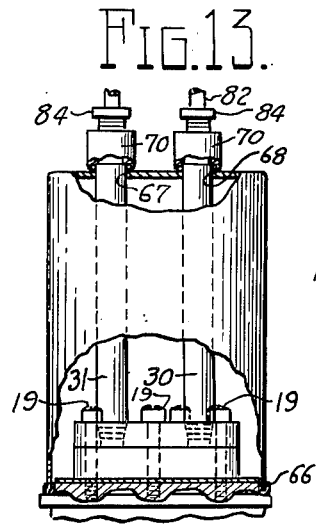
Fig.13.
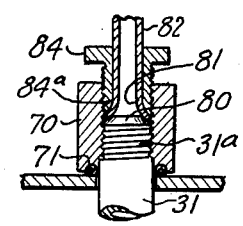
Fig.7.
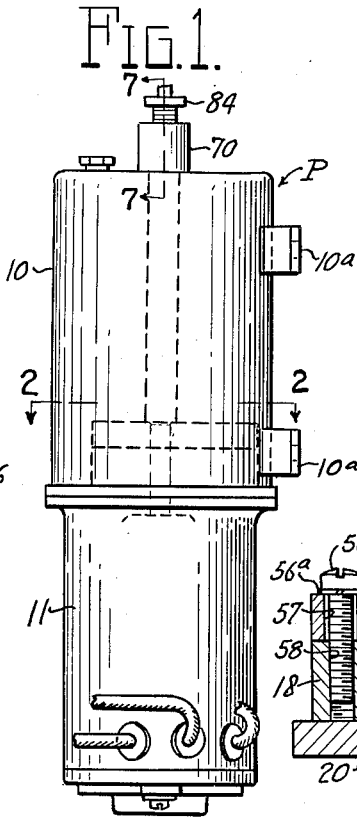
Fig.1.
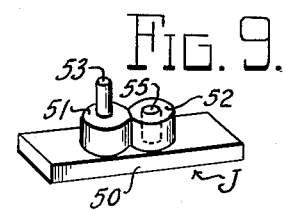
Fig.9.
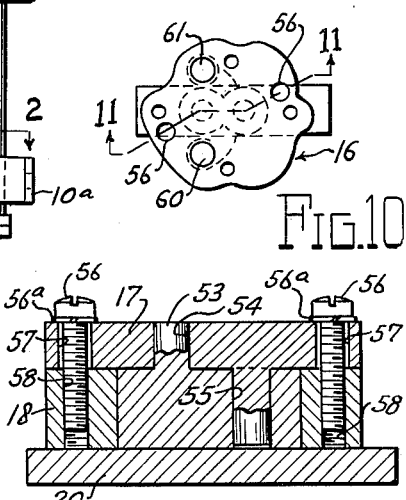
Fig.10.
Fig.11.
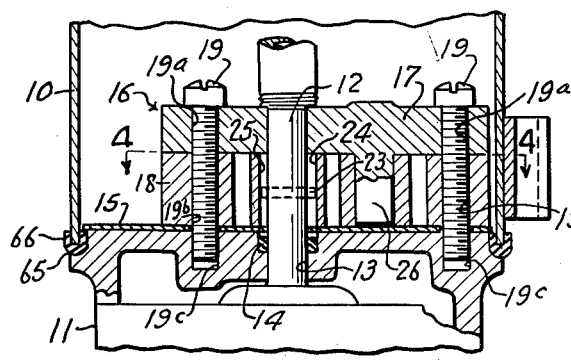
Fig.3.
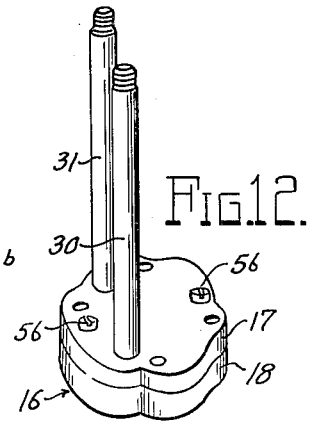
Fig.12.
INVENTOR.
John B. Parsons
BY
ATTORNEY Dec. 23, 1952 J. B. PARSONS 2,622,529
MOTOR AND PUMP ASSEMBLY
Filed July 13, 1950 3 Sheets-Sheet 2
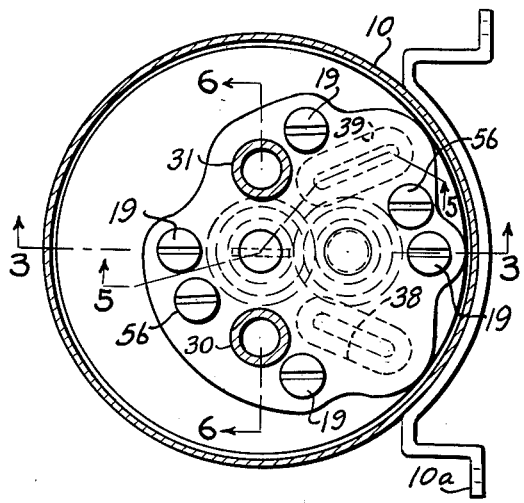
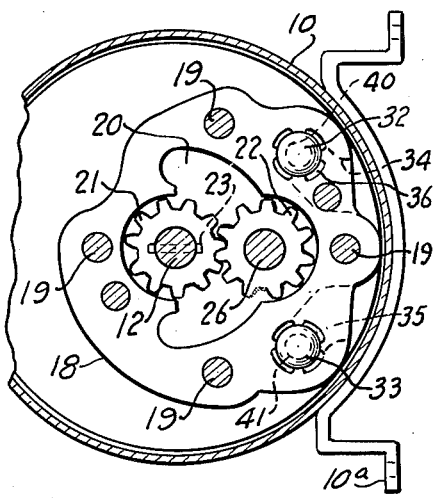
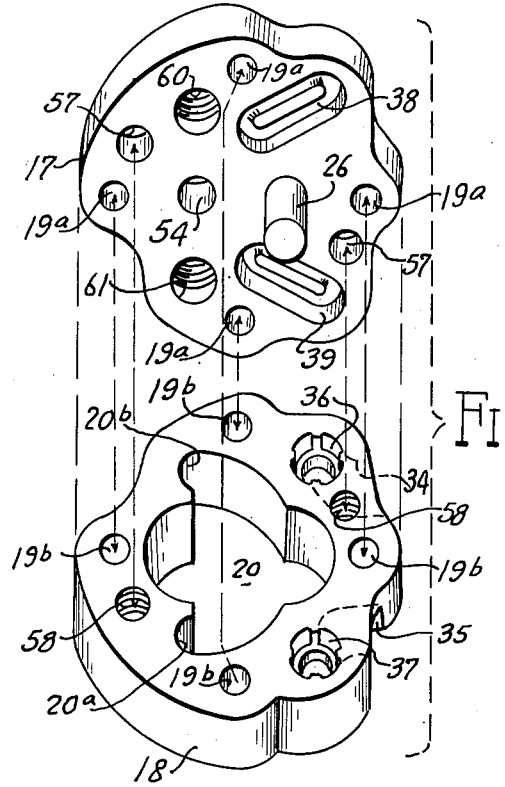
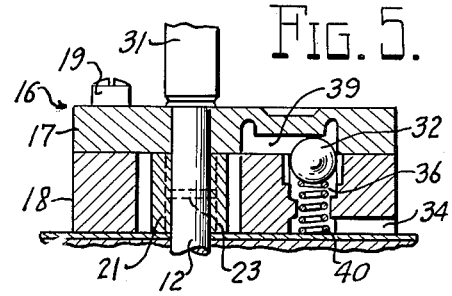
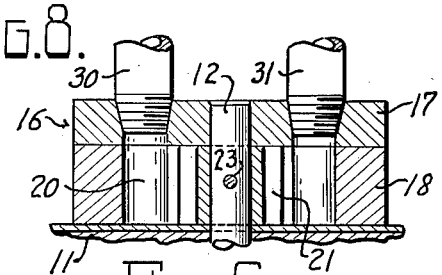
INVENTOR.
John B. Parsons
BY
ATTORNEY Dec. 23, 1952   J. B. PARSONS   2,622,529
MOTOR AND PUMP ASSEMBLY
Filed July 13, 1950   3 Sheets-Sheet 3
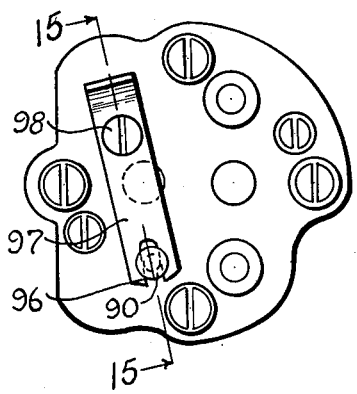
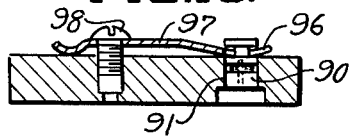
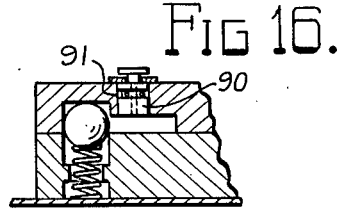
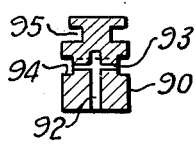
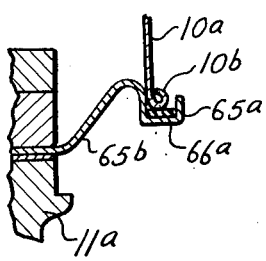
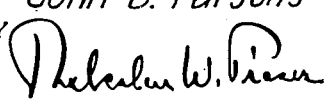
INVENTOR.
John B. Parsons
BY
ATTORNEY Patented Dec. 23, 1952

2,622,529

UNITED STATES PATENT OFFICE 2,622,529

MOTOR AND PUMP ASSEMBLY

John B. Parsons, Maumee, Ohio

Application July 13, 1950, Serial No. 173,526

12 Claims. (Cl. 103—2)

1

This invention relates to a motor and pump assembly but more particularly to a device which can be mounted as a unit and includes an electric motor, a hydraulic pump and a reservoir for the liquid handled by the pump.

An object is to produce a new and improved motor and hydraulic pump assembly which is simple and inexpensive to produce, easy to assemble and sturdy and reliable in operation.

Another object is to produce an assembly of the above character in which the pump subassembly is disposed within the reservoir thereby enabling the use of pump housing parts of molded powdered metal which require merely a slight amount of machining so that the expense of manufacture and assembly is substantially reduced without sacrificing satisfactory operation over an extended period of time.

A further object is to produce an assembly of the above character by which the liquid reservoir and pump subassembly are attached in a liquid-tight manner to the electric motor, the tubes connected to the pump serving as the securing means, thereby greatly simplifying the assembly and reducing the cost of manufacture.

A still further object is to produce a hydraulic pump unit from molded or cast powdered metal having new and improved features of design and construction to afford an efficient, less expensive unit and incorporating control valves of reliable construction and arrangement.

A still further object is to produce a simple and efficient method and device for assembling the pump parts not only to expedite production but to insure that the several parts are properly and accurately associated with each other.

A still further object is to improve the liquid-tight sealing between the reservoir and motor and between the reservoir and liquid-carrying tubes.

A still further object is to produce a new and improved connection between the liquid-carrying tubes forming a part of the assembly and the pipes leading therefrom to effect a satisfactory liquid-tight connection in an inexpensive and easy to apply manner.

Further objects and advantages of the invention will hereinafter appear and for purposes of illustration but not of limitation, an embodiment of the invention is shown in the accompanying drawings, in which:

Figure 1 is an elevation of the motor and pump assembly;

Figure 2 is an enlarged section taken substantially on the line 2—2 of Figure 1;

Figure 3 is a vertical section taken substantially on the line 3—3 of Figure 2;

Figure 4 is a transverse section taken substantially on the line 4—4 of Figure 3;

Figure 5 is a vertical section taken substantially on the line 5—5 of Figure 2;

Figure 6 is a vertical section taken substantially on the line 6—6 of Figure 2;

Figure 7 is an enlarged section taken substantially on the line 7—7 of Figure 1;

Figure 8 is an exploded perspective view of the two parts of the pump housing, showing the relationship of matching holes;

Figure 9 is a perspective view of a metal jig used in assembling the two parts of the pump housing;

Figure 10 is a top view of the housing sections fitted in position on the jig for assembling purposes;

Figure 11 is an enlarged vertical section taken substantially on the line 11—11 of Figure 10;

Figure 12 is a perspective view of the assembled housing parts with the pipes or tubes installed;

Figure 13 is a fragmentary vertical sectional view showing the final step in mounting the parts in the completed assembly;

Figure 14 is a top plan view of the pump housing showing a pressure relief valve;

Figure 15 is a sectional view on the line 15—15 of Figure 14;

Figure 16 is an enlarged detail sectional view showing the pressure release valve and spring tensioned ball valve;

Figure 17 is an enlarged longitudinal sectional view of the pressure release valve member; and Figure 18 is a fragmentary sectional view of an alternate seal for the mouth of the reservoir.

As shown in Figure 1, the motor and pump assembly P consists generally of a sheet metal inverted cup-shaped reservoir 10 to which a reversible electric motor 11 is attached in a novel manner as will hereinafter be described. Supporting brackets 10a are fixed to the side walls of the reservoir 10 in any suitable manner for use in mounting the assembly. The motor 11 has an armature shaft 12 which projects inside the reservoir 10 through a hole 13 in the inner end wall of the motor housing, a gasket 14 being provided to seal the opening around the shaft. Seating against the inner wall of the motor 11 is a thin plate 15 on which seats a pump housing 16.

The pump housing 16 is preferably of molded powdered metal and consists of an upper section 17 and a lower section 18, the two sections being attached to the adjacent end wall of the motor 11 by screws 19, as shown in Figures 2, 3 and 4. The lower section 18 has an open-ended cavity 20, which receives two gear pump elements 21 and 22, the gear or pinion 21 being mounted upon the motor shaft 12 and keyed thereto by a pin 23 which passes through the shaft 12 and fits slots 24 and 25 in the pinion 21. The gear 22 is mounted for free rotation on a post 26, which rigidly depends from the upper section 17 of the pump housing.

As shown particularly in Figure 6, tubes 30 and 31 are threaded into the upper section 17 of the pump housing and arranged to communicate with lateral extensions 20a and 20b respectively on the opposite sides of the cavity 20 in the lower housing section 18.

A pair of normally open ball check valves 32 and 33, tensioned by coil springs 40 and 41 respectively, control the supply of oil to the cavity 20 in the pump. Oil from the reservoir 10 flows through ducts 34 or 35 formed by grooves in the lower face of the pump section 18 to the respective openings 36 and 37 and thence around the respective balls 32 and 33, and finally through the respective passages 38 and 39 formed by grooves in the under face of the pump section 17 to one or the other cavity extensions 20a and 20b. If pressure is supplied by the rotation of the gears to one or the other sides of the cavity extensions 20a or 20b, this pressure will be sufficient to overcome the force of either of the springs 40 and 41, depending on the direction of rotation of the motor 11, and the ball valve controlled by this spring will then seat, causing the oil flow to be directed upward through either of the tubes 30 and 31, depending on the particular valve seated.

A particular feature of this invention is the method of assembly, such method being particularly adapted to avoid costly machining, and yet to obtain the accurately fitted parts necessary in a pump of this character.

The various steps of this assembly are particularly shown in Figures 9 to 13 inclusive. Referring to Figure 9, an accurate metal jig J has a base plate 50, carrying adjoining bosses 51 and 52, these bosses being shaped accurately to conform with the interior walls of the opening 20 in the lower housing plate 18. The boss 51 has a concentric upstanding pin 53 adapted accurately to fit the hole 54 in the upper housing plate 17, while the boss 52 has a concentric hole 55 adapted to receive the post 26 depending from the housing 17. Screw bolts 56 pass through holes 57 in the upper housing part 17 and threadedly engage tapped holes 58 in the lower housing part 18.

In assembling these parts, as shown in Figure 11, the housing sections 17 and 18 are placed on the metal jig J, and are thereby held in exact and proper alignment. As will be seen, the holes 57 in the housing part 17 are slightly larger than the bolts 56, thus allowance being made for any slight misalignment of holes. With the parts in exact position on the jig, the screws 56 are now tightened and the frictional engagement of the screw heads exerted on the top surface of the housing part 17, through spring washers 56a, holds the two housing parts 17 and 18 in exact aligned position. The tubes 30 and 31 are now screwed into the threaded holes 60 and 61 in the housing section 17, and the entire subassembly may now be removed from the jig, as shown in Figure 12.

Another feature of this invention is the use of the inlet and outlet tubes 30 and 31 as part of the means for mounting the reservoir on the motor. This is illustrated in Figure 13 in which the subassembly is shown in place within the reservoir.

Referring to Figures 3 and 13, the end wall of the motor has an external annular recessed shoulder to receive a U-shaped rubber gasket 66, which fits over the free end of the reservoir. Before placing the reservoir 10 on the motor 11, the subassembly, as shown in Figure 12, is bolted to the motor by four bolts 19, these bolts passing through holes 19a in the housing section 17, 19b in the housing section 18 and being received in tapped holes 19c in the top wall of the motor housing. The reservoir is now placed over the subassembly with the tubes 30 and 31 projecting through holes 67 and 68 in the closed end of the reservoir, and with the lower free edge of the reservoir engaging the U-shaped gasket 66.

An alternate form of connection between the reservoir and motor is shown in Figure 18 in which the mouth of the reservoir 10a terminates in curled flange 10b. The curled flange enters an annular channel 65a in a plate 65b and interposed is a rubber ring 66a serving as a seal. The parts are secured to the motor 11a as above described.

Referring to Figure 7, the tops of the tubes 30 and 31 are threaded, as at 31a and, therefore, to complete the assembly of the reservoir and motor, it is only necessary to tighten the nuts 70 and these, acting against rubber O rings 71 force the reservoir into final fluid-tight position, the tie being provided by the tubes 30 and 31, the housing 16 and the bolts 19.

A special feature of the connection for line piping is illustrated in Figure 7. Here it will be seen that the tubes 30 and 31 are provided with an annular conical top surface 80 adapted to contact the flared end 81 of the connecting tube 82. A jamb nut 84, of a threaded external diameter the same as the tube 31a and having an internally flared end 84a, is adapted to force the flared tube end 81 against the conical surface 80 on the pipes 30 and 31 and thereby effect a simple and inexpensive fluid-tight joint.

From the above description, it will be apparent that I have produced an exceeding simple motor pump and reservoir assembly which can be mounted as a unit in position of use. As above mentioned, the pump housing parts 17 may be formed of molded or cast powdered metal which enables the parts to be accurately formed in much less expensive fashion. All that needs to be done after the housing parts have been molded is to machine the contacting surfaces of the parts 17 and 18. Inasmuch as this connection between the parts may not form an entirely liquid-tight seal, the pump unit by design is placed within the reservoir so that the slight amount of leakage that might occur will not in any way be detrimental. It will also be noticed that the ball valves and springs are assembled at the same time which also expedites the assembly procedure which is rendered exceedingly simple by the use of the novel fixture J above described.

Another feature of importance is the means by which the reservoir or can 10 is attached to the end wall or end plate of the motor housing, this being achieved through the use of the liquid-carrying tubes 30 and 31 on which the nuts 70 are screwed. At the same time, the O rings 71 are compressed to form not only a liquid-tight seal between the nuts and the end wall of the reservoir 10, but also between the tubes and reservoir. Thus the tubes 30 and 31 are not only assembled with the pump in a simple manner, but these same tubes also are employed in the attachment of the reservoir to the motor.

The above motor and pump assembly may be employed for many purposes, but is primarily adapted for use in a closed hydraulic system so that when the reversible motor is energized to rotate in one direction, liquid will be forced by the pump out through one of the tubes 30 and 31 and liquid will be returned to the reservoir through the other of these tubes. Thus according to the direction of rotation of the electric motor, one or the other of the tubes serves as a pressure outlet and the other serves as a return duct. One important use for this assembly is in connection with raising and lowering of tops for convertible automobiles. There, a piston and cylinder assembly is used for opposites sides and, when the pistons are forced out of their cylinders, the top is raised and, when they are forced into their cylinders, the top is lowered. Thus, one end of each cylinder connects to one of the tubes and the opposite end is connected to the other of these tubes. Since the capacities of each cylinder on opposite sides of the piston are unequal (the piston rod occupies a portion of the space on one side of the piston) more liquid is needed on one side of the piston than on the other. This is taken care of by having the ball valve 32 or 33 open on the intake side of the pump enabling free communication with the reservoir. Another advantage of these normally open valves is to enable manual raising and lowering of the top. This is possible since the liquid can be forced from one end of each cylinder to the other end as will be readily apparent.

A pressure relief valve is shown in Figures 14 and 15 and consists of cylindrical valve 90, which slides in a hole 91 formed in the pump housing part 17. The valve has a longitudinal passage 92 opening at its lower end inside the pump. The upper end of the passage 92 communicates with lateral passages 93 that open at their outer ends in a peripheral groove 94. At the upper end, the valve has a reduced neck 95 to receive the notched end 96 of a leaf spring 97 adjustably anchored at its opposite end by a screw 98. When the pressure within the pump chamber becomes excessive, it forces the valve 90 upwardly until the groove 94 clears the upper surface of the pump housing, thereby allowing fluid to be released through the passages 92 and 93. The spring 97 returns the valve to closed position when the excessive pressure has been relieved. The above arrangement is useful with a unidirectional motor when the relief valve is associated with the pressure side of the pump. However, two relief valves may be used with a reversible motor, one being associated with the pressure side of the pump and the other with the intake side.

It is to be understood that numerous changes in details of construction, arrangement and operation may be effected without departing from the spirit of the invention especially as defined in the appended claims.

What I claim is:

1. A motor and pump assembly comprising an electric motor, a cup-shaped reservoir having its open end in abutting relation to said motor, a hydraulic pump unit within said reservoir including a housing and a pair of rotors within the housing, one of the rotors being directly connected to said motor, inlet and outlet passages on one side of said housing in communication with said pump rotors respectively, means to anchor the pump unit to the motor, a pair of tubes communicating with said passages respectively, extending longitudinally of said reservoir and projecting through openings in the end wall of said reservoir, a sealing device between the free end of said reservoir and said motor, and fasteners on the free ends of said tubes respectively abutting against said reservoir and holding said sealing device in liquid-tight contact with said motor.

2. A motor and pump assembly comprising an elongate motor having a housing, end walls for said housing, a motor shaft projecting through the inner end wall of said housing, a cup-shaped reservoir having its open end in abutting relation to said inner end wall of the motor, a hydraulic pump unit within said reservoir and including a two-part pump housing, a pair of interfitting pump rotors within said housing, a direct connection between one rotor and said motor shaft, fasteners securing said pump parts together, other fasteners extending through said pump parts and into engagement with the inner end wall of the motor, inlet and outlet passages in said pump housing communicating with said rotors respectively, a pair of tubes engaging one housing part and communicating respectively with said passages, said tubes extending in parallel relation longitudinally of the reservoir and projecting through openings in the end wall thereof, threaded portions on the projecting free ends of said tubes respectively, nuts on said threaded tube ends, a seal between each nut and the end wall of the reservoir and the adjacent tube, and a seal between the free end of said reservoir and the inner end wall of said motor housing.

3. A motor and pump assembly comprising an elongate motor having a housing, end walls for said housing, a motor shaft projecting through the inner end wall of said housing, a cup-shaped reservoir having its open end in abutting relation to said inner end wall of the motor, a hydraulic pump unit within said reservoir and including a two-part pump housing, a pair of interfitting pump rotors within said housing, a direct connection between one rotor and said motor shaft, fasteners securing said pump parts together, other fasteners extending through said pump parts and into engagement with the inner end wall of the motor, inlet and outlet passages in said pump housing communicating with said rotors respectively, a pair of tubes engaging one housing part and communicating respectively with said passages, said tubes extending in parallel relation longitudinally of the reservoir and projecting through openings in the end wall thereof, threaded portions on the projecting free ends of said tubes respectively, nuts on said threaded tube ends, a seal between each unit and the end wall of the reservoir and the adjacent tube, a seal for the open mouth of the reservoir and associated with the motor housing, and a rubber O ring between each nut and reservoir for providing a liquid-tight seal between each tube and the reservoir.

4. A motor and pump assembly comprising a reversible electric motor, a cup-shaped sheet metal reservoir having its open end in end abutting relation to the motor, a hydraulic pump unit within said reservoir including a pump housing anchored to said motor and having a pair of adjoining rotor cavities, interengaging pump rotors within said cavities respectively, one rotor being operatively connected to said motor, passages leading from each cavity and opening into the reservoir, valves controlling said passages respectively, a pair of passages leading from said cavities respectively, a tube connected to each of said last passages and extending longitudinally inside the reservoir with end portions thereof projecting through the end wall of the reservoir, fasteners on said projecting tube end portions for securing the reservoir to the motor, and a liquid-tight seal between the reservoir and motor.

5. A motor and pump assembly for use in a closed hydraulic system comprising a reversible electric motor, a cup-shaped sheet metal reservoir having its open end in end abutting relation to the motor, a hydraulic pump unit within said reservoir including a pump housing anchored to said motor and having a pair of adjoining rotor cavities, interengaging pump rotors within said cavities respectively, one rotor being operatively connected to said motor, passages leading from each cavity and opening into the reservoir, valves controlling said passages respectively, springs urging said valves normally to open said passages, the arrangement being such that one or the other valve depending upon the direction of the rotation of the pump, may be seated, a pair of passages leading from said cavities respectively, a tube connected to each of said last passages and extending longitudinally inside the reservoir with end portions thereof projecting through the end wall of the reservoir, fasteners on said projecting tube end portions for securing the reservoir to the motor, and a liquid-tight seal between the reservoir and motor.

6. A motor and pump assembly comprising a reversible electric motor, a cup-shaped sheet metal reservoir in end to end abutting relation to said motor with the open end of the reservoir facing the motor, a pump unit aranged wholly within said reservoir and operatively connected to be driven by said motor, said pump unit including a housing of molded powdered metal, said housing having valve controlled passages communicating with the interior reservoir, means securing the pump unit to the motor, a pair of tubes leading respectively from the opposite sides of the pump and extending longitudinally through the reservoir with end portions projecting through openings in the enclosed end of the reservoir, and means engaging said projecting tube end portions for securing the reservoir to the motor and sealing the tube with relation to the reservoir.

7. In the organization as claimed in claim 6, valves in said passages, and spring means for holding the valves normally open.

8. A hydraulic pump housing comprising a pair of flat plate-like members, a rotor-receiving opening extending entirely through one member, lateral extensions of said opening also extending entirely through said one member and constituting fluid passages, a pair of valve means in said one member including a pair of laterally spaced stepped holes therethrough and a spring tensioned check valve in each hole, grooves in the inner face of the other housing member connecting said lateral extensions and valve means respectively, and inlet and outlet holes through said other housing member communicating with said lateral extensions respectively, said stepped holes communicating with the exterior of said housing and constituting inlet passages, said check valves being normally open but being selectively closable in response to the reverse flow of fluid in the stepped holes in which they are respectively disposed so as to block the associated inlet passage against exhaust of fluid therethrough.

9. A hydraulic pump unit as claimed in claim 8, in which the housing parts are of molded powdered metal.

10. The combination of a closed liquid reservoir, a pump unit arranged within said reservoir, said unit comprising a two-part housing, a rotor-receiving opening extending entirely through one housing part, lateral extensions of said opening also extending entirely through said last housing part and constituting fluid passages, a pair of laterally spaced stepped holes extending through said last housing part, grooves in the face of said last housing part for establishing a liquid connection between said stepped holes respectively and the interior of said reservoir, a spring-tensioned ball valve in each of said stepped holes, grooves in the inner face of the other housing part establishing a connection between said lateral extensions and said stepped holes respectively said stepped holes communicating with the exterior of said housing and constituting inlet passages, said ball valves being normally open but being selectively closable in response to the reverse flow of fluid in the stepped holes in which they are respectively disposed so as to block the associated inlet passages against exhaust of fluid therethrough, inlet and outlet holes through said other housing part communicating with said lateral extensions respectively, tubes connecting said inlet and outlet holes respectively and extending longitudinally through said reservoir, means for connecting the free ends of said tubes to said reservoir, interconnected pump rotors in said rotor-receiving opening, and reversible means for driving said pump rotors.

11. A motor and pump assembly comprising a reversible electric motor, a cup-shaped sheet metal reservoir in end to end abutting relation to said motor with the open end of the reservoir facing the motor, a pump unit arranged wholly within said reservoir and operatively connected to be driven by said motor, said pump unit including a housing of molded powdered metal, said housing having valve controlled passages communicating with the interior of the reservoir, pressure relief valve means in said pump housing adapted to open into said reservoir for relieving excessive pressure within the housing, means securing the pump unit to the motor, a pair of tubes leading respectively from the opposite sides of the pump and extending longitudinally through the reservoir with end portions projecting through openings in the closed end of the reservoir, and means engaging said projecting tube end portions for securing the reservoir to the motor and sealing the tube with relation to the reservoir.

12. The organization as claimed in claim 11, in which the pressure relief valve means comprises a valve slidable in an opening in one pump housing part, fluid passages in the inner portion of the valve adapted to be uncovered upon outward movement of the valve, and a spring normally holding such valve in closed position.

JOHN B. PARSONS.

REFERENCES CITED

The following references are of record in the file of this patent:

UNITED STATES PATENTS

| Number | Name | Date |
| --- | --- | --- |
| 1,418,741 | Stallman | June 6, 1922 |
| 1,577,622 | Gaston | Mar. 23, 1926 |
| 1,913,537 | Ekstrom | June 13, 1933 |
| 1,957,038 | Beidler | May 1, 1934 |
| 1,987,366 | Ford | Jan. 8, 1935 |
| 1,992,200 | Ford | Feb. 26, 1935 |
| 2,031,159 | Griffith | Feb. 18, 1936 |
| 2,139,370 | Lauer et al. | Dec. 6, 1938 |
| 2,277,270 | Schmitter et al. | Mar. 24, 1951 |
| 2,540,235 | Berkley | Feb. 6, 1951 |
| 2,552,169 | Graham | May 8, 1951 |